(12) United States Patent
Zhan et al.

(10) Patent No.: US 12,024,470 B2
(45) Date of Patent: Jul. 2, 2024

(54) FABRICATION OF DOWNHOLE DRILLING TOOLS

(71) Applicants: Saudi Arabian Oil Company, Dhahran (SA); Chengdu Dongwei Technology Co., LTD, Chengdu (CN)

(72) Inventors: Guodong Zhan, Dhahran (SA); Jianhui Xu, Dhahran (SA); Duanwei He, Chengdu (CN); Abrar Alshaikh, Saihat (SA)

(73) Assignees: Saudi Arabian Oil Company, Dhahran (SA); Chengdu Dongwei Technology Co., LTD., Chengdu (CN)

( * ) Notice: Subject to any disclaimer, the term of this patent is extended or adjusted under 35 U.S.C. 154(b) by 0 days.

(21) Appl. No.: 17/170,006

(22) Filed: Feb. 8, 2021

(65) Prior Publication Data
US 2022/0250989 A1 Aug. 11, 2022

(51) Int. Cl.
*C04B 35/5831* (2006.01)
*C04B 35/645* (2006.01)
*E21B 10/00* (2006.01)

(52) U.S. Cl.
CPC ........ *C04B 35/5831* (2013.01); *C04B 35/645* (2013.01); *E21B 10/00* (2013.01);
(Continued)

(58) Field of Classification Search
CPC .............. C04B 35/5831; C04B 35/645; C04B 2235/386; C04B 2235/427; C04B 2235/604; C04B 2235/6567; C04B 2235/785; C04B 2235/786; C04B 2235/85; E21B 10/00
See application file for complete search history.

(56) References Cited

U.S. PATENT DOCUMENTS

| 3,632,369 A | 1/1972 | Hahn et al. |
| 4,017,480 A | 4/1977 | Baum |

(Continued)

FOREIGN PATENT DOCUMENTS

| AU | 2005286168 | 3/2006 |
| CN | 104612583 | 5/2015 |

(Continued)

OTHER PUBLICATIONS

U.S. Appl. No. 63/031,077, Zhan et al., filed May 28, 2020.
(Continued)

*Primary Examiner* — James A Fiorito
*Assistant Examiner* — Ross J Christie
(74) *Attorney, Agent, or Firm* — Fish & Richardson P.C.

(57) ABSTRACT

A method of forming a composite cutter for a downhole drilling tool is described. The method includes: mixing a polycrystalline diamond powder and a cubic boron nitride powder with a molar ratio between 0.1 and 0.9 to form a catalyst-free composite mixture; placing the catalyst-free composite mixture into a mold configured in a shape of a cutter; exposing the catalyst-free composite mixture to an ultra-high-pressure, high-temperature treatment including a pressure between 11 Gigapascals (GPa) and 20 GPa, and a temperature between 1300 Kelvins (K) and 2600 K to form a solid composite body; and cooling the solid composite body to form the composite cutter.

10 Claims, 6 Drawing Sheets

(52) U.S. Cl.
CPC .. *C04B 2235/386* (2013.01); *C04B 2235/427* (2013.01); *C04B 2235/604* (2013.01); *C04B 2235/6567* (2013.01); *C04B 2235/785* (2013.01); *C04B 2235/786* (2013.01); *C04B 2235/85* (2013.01)

(56) References Cited

U.S. PATENT DOCUMENTS

| | | | |
|---|---|---|---|
| 4,129,437 A | 12/1978 | Taguchi et al. |
| 4,181,752 A | 1/1980 | Martens et al. |
| 4,255,165 A | 3/1981 | Dennis et al. |
| 4,288,248 A | 9/1981 | Bovenkerk et al. |
| 4,334,928 A | 6/1982 | Hara |
| 4,343,651 A | 8/1982 | Yazu et al. |
| 4,394,170 A | 7/1983 | Sawaoka et al. |
| 4,525,178 A | 6/1985 | Hall |
| 4,664,705 A | 5/1987 | Horton et al. |
| 4,859,531 A | 8/1989 | Tsuji et al. |
| 4,943,488 A | 7/1990 | Sung et al. |
| 4,945,073 A | 7/1990 | Dubensky et al. |
| 5,000,273 A | 3/1991 | Horton et al. |
| 5,030,276 A | 7/1991 | Sung et al. |
| 5,037,704 A | 8/1991 | Nakai et al. |
| 5,096,465 A | 3/1992 | Chen et al. |
| 5,199,832 A | 4/1993 | Meskin et al. |
| 5,326,380 A | 7/1994 | Yao et al. |
| 5,337,844 A | 8/1994 | Tibbitts |
| 5,370,195 A | 12/1994 | Keshavan et al. |
| 5,387,776 A | 2/1995 | Preiser |
| 5,523,158 A | 6/1996 | Kapoor et al. |
| 5,603,070 A | 2/1997 | Cerutti et al. |
| 5,833,021 A | 11/1998 | Mensa-Wilmot et al. |
| 5,848,348 A | 12/1998 | Dennis |
| 5,889,219 A | 3/1999 | Moriguchi et al. |
| 6,008,153 A | 12/1999 | Kukino et al. |
| 6,073,518 A | 6/2000 | Chow et al. |
| 6,096,436 A | 8/2000 | Inspektor |
| 6,209,420 B1 | 4/2001 | Butcher et al. |
| 6,453,899 B1 | 9/2002 | Tselesin |
| 6,469,278 B1 | 10/2002 | Boyce |
| 6,623,850 B2 | 9/2003 | Kukino et al. |
| 7,322,776 B2 | 1/2008 | Webb et al. |
| 7,441,610 B2 | 10/2008 | Belnap et al. |
| 7,645,513 B2 | 1/2010 | Bello et al. |
| 7,647,992 B2 | 1/2010 | Fang et al. |
| 8,071,173 B1 | 12/2011 | Sani |
| 8,130,903 B2 | 3/2012 | Corbett et al. |
| 8,512,865 B2 | 8/2013 | DiGiovanni |
| 8,734,552 B1 | 5/2014 | Vail et al. |
| 8,931,582 B2 | 1/2015 | Cooley et al. |
| 8,960,337 B2 | 2/2015 | Hall et al. |
| 9,097,074 B2 * | 8/2015 | Shen ............... E21B 10/5676 |
| 9,254,554 B1 | 2/2016 | Bertagnolli |
| 9,435,159 B2 | 9/2016 | Scott |
| 9,482,056 B2 | 11/2016 | Eyre et al. |
| 9,683,410 B2 | 6/2017 | Zhang et al. |
| 10,017,998 B2 | 7/2018 | Bilen et al. |
| 10,118,223 B2 | 11/2018 | Eason |
| 10,179,390 B2 | 1/2019 | Mukhopadhyay et al. |
| 10,612,311 B2 | 4/2020 | Duerholt |
| 10,682,238 B2 | 6/2020 | Petersheim et al. |
| 10,704,334 B2 | 7/2020 | Jiang |
| 10,711,331 B2 | 7/2020 | Chang et al. |
| 10,946,500 B2 | 3/2021 | Chapman et al. |
| 2003/0052098 A1 | 3/2003 | Kim et al. |
| 2008/0223623 A1 | 9/2008 | Keshavan et al. |
| 2008/0312892 A1 | 12/2008 | Heggemann |
| 2010/0276209 A1 | 11/2010 | Yong et al. |
| 2011/0031026 A1 | 2/2011 | Oxford et al. |
| 2011/0083908 A1 | 4/2011 | Shen et al. |
| 2011/0271603 A1 | 11/2011 | Voronin et al. |
| 2012/0097457 A1 | 4/2012 | Setlur et al. |
| 2012/0125696 A1 | 5/2012 | Belnap et al. |
| 2013/0056284 A1 | 3/2013 | Atkins et al. |
| 2013/0067824 A1 | 3/2013 | King et al. |
| 2013/0277121 A1 | 10/2013 | Stevens et al. |
| 2013/0320598 A1 | 12/2013 | Atkins et al. |
| 2014/0110180 A1 | 4/2014 | Yu et al. |
| 2014/0123562 A1 | 5/2014 | Voronin |
| 2014/0174633 A1 | 6/2014 | Andersin et al. |
| 2014/0283457 A1 | 9/2014 | Cariveau et al. |
| 2014/0318392 A1 | 10/2014 | Sajgalik et al. |
| 2015/0075714 A1 | 3/2015 | Sun et al. |
| 2015/0284833 A1 | 10/2015 | Hsiao et al. |
| 2015/0292270 A1 | 10/2015 | Zhang et al. |
| 2018/0029942 A1 | 2/2018 | Ishida |
| 2018/0058148 A1 | 3/2018 | Zhang et al. |
| 2018/0126516 A1 | 5/2018 | Kanyanta et al. |
| 2018/0202234 A1 | 7/2018 | Saini et al. |
| 2018/0208511 A1 | 7/2018 | Liang et al. |
| 2018/0215671 A1 | 8/2018 | Sani et al. |
| 2018/0265416 A1 | 9/2018 | Ishida et al. |
| 2019/0078390 A1 | 3/2019 | Belnap et al. |
| 2020/0001367 A1 | 1/2020 | Duffy et al. |
| 2021/0032934 A1 | 2/2021 | Zhan et al. |
| 2021/0034029 A1 | 2/2021 | Zhan et al. |
| 2021/0238102 A1 | 8/2021 | Terasaki |
| 2021/0277721 A1 | 9/2021 | Portwood et al. |
| 2021/0371345 A1 | 12/2021 | Zhan et al. |
| 2023/0201921 A1 | 6/2023 | Zhan et al. |
| 2023/0212914 A1 | 7/2023 | Zhan et al. |

FOREIGN PATENT DOCUMENTS

| | | | |
|---|---|---|---|
| CN | 105127430 | | 12/2015 |
| CN | 103953279 | | 2/2016 |
| CN | 106119763 | | 11/2016 |
| CN | 103803985 B | * | 8/2017 |
| CN | 108950561 A | * | 12/2018 ............. B22F 1/007 |
| CN | 109046179 | | 12/2018 |
| CN | 109437920 | | 3/2019 |
| CN | 110369714 | | 10/2019 |
| EP | 0437855 | | 7/1991 |
| EP | 3333141 | | 6/2018 |
| GB | 1572460 | | 7/1980 |
| GB | 1574615 | | 9/1980 |
| JP | S 62274034 | | 11/1987 |
| JP | 2009067609 | | 4/2009 |
| JP | 4275896 | | 6/2009 |
| JP | 5013156 | | 8/2012 |
| WO | WO 81/003295 | | 11/1981 |
| WO | WO 99/036658 | | 7/1999 |
| WO | WO 2006032984 | | 3/2006 |
| WO | WO 2010111578 | | 9/2010 |
| WO | WO 2014088569 | | 6/2014 |
| WO | WO 2017011415 | | 1/2017 |
| WO | WO 2018167022 | | 9/2018 |

OTHER PUBLICATIONS

U.S. Appl. No. 63/033,669, Zhan et al., filed Jun. 2, 2020.
Commer et al., "New advances in three-dimensional controlled-source electromagnetic inversion," Geophys. J. Int., 172:, 2008, 513-535, 23 pages.
Liu et al., "Hardness of Polycrystalline Wurtsite Boron Nitride (wBN) Compacts," Scientific Reports, 9(1):, Jul. 2019, 6 pages.
Liu et al., "Superstrong micro-grained polycrystalline diamond compact through work hardening under high pressure," Appl. Phys. Lett. 112:, Feb. 2018, 6 pages.
Metco, "An Introduction to Thermal Spray," Issue 4, 2013, 24 pages.
Thefreedictionary.com [online], "Paddle", Jan. 2004, [retrieved on Apr. 12, 2021], retrieved from: URL <https://www.thefreedictionary.com/paddle>, 8 pages.
Utkin et al., "Shock Compressibility and Spallation Strength of Cubic Modification of Polycrystalline Boron Nitride," High Tempertaure, 47(5):, 2009, 628-634, 7 pages.
GCC Examination Report in GCC Appln. No. GC 2020-40173, dated Sep. 26, 2021, 5 pages.
GCC Examination Report in GCC Appln. No. GC 2020-40176, dated Sep. 7, 2021, 3 pages.

(56) References Cited

OTHER PUBLICATIONS

U.S. Appl. No. 17/336,637, Zhan et al., filed Jun. 2, 2021.
PCT International Search Report and Written Opinion in International Appln. No. PCT/US2021/034192, dated Aug. 31, 2021, 14 pages.
PCT International Search Report and Written Opinion in International Appln. No. PCT/US2021/035424, dated Sep. 20, 2021, 15 pages.
PCT International Search Report and Written Opinion in International Appln. No. PCT/US2020/043411, dated Oct. 23, 2020, 15 pages.
PCT International Search Report and Written Opinion in International Appln. No. PCT/US2020/043872, dated Oct. 20, 2020, 25 pages.
CN Office Action in Chinese Appln. No. 202180038314.9, dated Jul. 18, 2023, 24 pages, with English Translation.
PCT International Search Report and Written Opinion in International Appln. No. PCT/US2023/010037, dated Apr. 17, 2023, 20 pages.
Aghaei, "Atomic Layer Deposition: An Overview Al 2 O 3 ALD on Carbon Nanotubes and Graphene Surfaces," Chem. Rev., 2010, 110:111-131, 22 pages.
Durrand et al., "Thick PDC, Shaped Cutters for Geothermal Drilling: A Fixed Cutter Solution for a Roller Cone Drilling Environment," 44th U.S. Rock Mechanics Symposium and 5th U.S.-Canada Rock Mechanics Symposium, Jun. 2010, 11 pages.
Fabreguette et al., "Ultrahigh x-ray reflectivity from W/Al2O3 multilayers fabricated using atomic layer deposition," Appl. Phys. Lett., 2006, 88, 013116, 3 pages.
Ju, "Rock Breaking Mechanism Analysis and Structure Design of the Conical PDC Cutter Based on Finite Element Method," Engineering Letters, Mar. 2019, 27(1):75-80, 6 pages.
Li et al., "Ultrastrong catalyst-free polycrystalline diamond," Nature Research, Scientific reports, Dec. 2020, 10:22020, 10 pages.
Meta-Braze VBC Group, "Meta-Braze Cu93Ti: Copper based brazing alloy for ceramics," 2018, 1 page.
Meta-braze.com [online], "Copper Brazing Alloys for Tungsten Carbide," available on or before Sep. 30, 2020 via Internet Archive Wayback Machine URL <https://web.archive.org/web/20200930185357/https://www.meta-braze.com/products/base-metal-brazing-alloys/copper-brazing-alloys-for-tungsten-carbide>, retrieved on Mar. 15, 2022, retrieved from URL <https://www.meta-braze.com/products/base-metal-brazing-alloys/copper-brazing-alloys-for-tungsten-carbide>, 2 pages.
Meta-braze.com [online], "Nickel based Brazing Alloys," available on or before Aug. 12, 2020 via Wayback Machine Archive URL <https://web.archive.org/web/20200812204140/https://www.meta-braze.com/products/base-metal-brazing-alloys/nickel-based-brazing-alloys>, retrieved on Mar. 15, 2022, retrieved from URL <https://www.meta-braze.com/products/base-metal-brazing-alloys/nickel-based-brazing-alloys>, 3 pages.
U.S. Appl. No. 17/549,290, Xu et al., Producing Polycrystalline Diamond Compact Cutters With Coatings, filed Dec. 13, 2021, 61 pages.
U.S. Appl. No. 17/567,531, Zhan et al., Producing Polycrystalline Diamond Compact (PDC) Drill Bits With Catalyst-Free and Substrate-Free PDC Cutters, filed Jan. 3, 2022, 49 pages.
U.S. Appl. No. 17/740,741, Zhan et al., Fabricating Drill Bits, filed May 10, 2022, 47 pages.
Xiong et al., "Comparative analysis cutting characteristics of stinger PDC cutter and conventional PDC cutter," Journal of Petroleum Science and Engineering, 2020, 189:106792, 13 pages.
Zhan et al., "New Ultra-Strong and Catalyst-Free PDC Cutting Element Technology," IPTC-19764-MS, International Petroleum Technology Conference, Jan. 13-15, 2020, 12 pages.
PCT International Search Report and Written Opinion in International Appln. No. PCT/US2023/019553, dated Jul. 18, 2023, 20 pages.

* cited by examiner

FABRICATION OF DOWNHOLE DRILLING TOOLS

TECHNICAL FIELD

The present disclosure relates to downhole drilling tools, more particularly diamond/boron nitride (BN) composite cutters for downhole drill bits.

BACKGROUND

Drilling hard, abrasive, and interbedded formations pose a challenge for polycrystalline diamond compact (PDC) drill bits equipped with PDC cutters formed using high pressure and high temperature (HPHT) technology. Historically, PDC cutters, generally forming a cutting layer, also called a diamond table, dull due to abrasive wear, impact damage, and thermal fatigue. Hardness, fracture toughness, and thermal stability of PDC cutters are important factors for drill bits in harsh drilling environments.

SUMMARY

This specification describes a method for fabricating catalyst-free ultrahard composite cutters that can be used to extend the life of PDC drilling tools. The drilling tools include PDC drill bits, reamers, hole openers, milling tools, and stabilizers. The models and methods described in this specification provide a mechanical alloying procedure to fabricate a composite cutter. The PDC drill bits with the composite cutters can be used to improve drilling efficiency in oil and gas wellbore formations.

A polycrystalline diamond powder and a cubic boron nitride powder with a characteristic grain size between 0.1 and 50 micrometers (μm) are mechanically mixed to form a composite mixture. The composite mixture is placed in a mold with a shape of a cutter and an ultra-high-pressure, high-temperature treatment (UHPHT) is applied. The sintering treatment initiates a solid phase reaction within the composite mixture as a result of applied pressure between 11 gigapascal (GPa) and 20 GPa, and applied temperature between 1300 Kelvins (K) and 2600 K. After the UHPHT treatment is terminated, the composite mixture is cooled down and decompressed for up to 15 hours. The final composite compact will be used as a cutting or drilling layer of a full-scale composite cutter ready to be assembled into a drill bit.

In some aspects, a method of forming a composite cutter for a downhole drill bit includes mixing a polycrystalline diamond powder and a cubic boron nitride powder with a molar ratio between 0.1 and 0.9 to form a catalyst-free composite mixture; placing the catalyst-free composite mixture into a mold configured in a shape of a cutter; exposing the catalyst-free composite mixture to an ultra-high-pressure, high-temperature treatment including a pressure between 11 Gigapascals (GPa) and 20 GPa, and a temperature between 1300 Kelvins (K) and 2600 K to form a solid composite body; and cooling the solid composite body to form the composite cutter.

In some aspects, a method of forming a composite cutter for a downhole drill bit includes mixing a polycrystalline diamond powder and a cubic boron nitride powder with a molar ratio between 0.1 and 0.9 to form a catalyst-free composite mixture; pressing the catalyst-free composite mixture into a mold configured in a shape of a cutter; determining a pressure and a temperature window at which an ultra-high-pressure, high-temperature treatment of the catalyst-free composite mixture forms a solid composite body; exposing the catalyst-free composite mixture to the ultra-high-pressure, high-temperature treatment within the pressure and the temperature window to form the solid composite body; and cooling the solid composite body to form the composite cutter.

Embodiments of a method of forming a composite cutter for a downhole drill bit can include one or more of the following features.

In some embodiments, providing the catalyst-free synthesized composite mixture includes the polycrystalline diamond powder and the cubic boron nitride powder with a characteristic grain size between 0.1 and 50 μm.

In some embodiments, the method includes drying the catalyst-free synthesized composite mixture in a vacuum furnace at a temperature between 1100 K and 1350 K for a duration between 1 hour and 2 hours.

In some embodiments, the ultra-high-pressure, high-temperature treatment includes between 1 minute and 10 minutes.

In some embodiments, cooling the solid composite body includes between 2 and 10 hours of decompression.

In some embodiments, sintering includes forming a strong covalent bonding using the cubic boron nitride powder. In some cases, the cubic boron nitride powder acts as a binder.

In some embodiments, the method includes forming new chemical bonds at or near the diamond and cBN grain boundaries of the diamond-cBN composite. In some cases, the new chemical bonds include B—C and C—N.

The absence of metallic catalyst (e.g., cobalt binder) enables the composite cutter to exhibit improved properties. For example, a hardness greater than 70 GPa which far exceeds the hardness of a single crystalline cubic BN (approximately 47 GPa) and approaches the current PDC cutters (approximately 70 GPa). The absence of the catalyst reduces oxidation and the composite cutter can provide an onset oxidation temperature greater than 1070 K rather than the oxidation temperature of 869 K provided by some other approaches to forming PDC cutters. The composite cutters have superior thermal stability than diamond and can be used as general-purpose drilling and cutting structures. The absence of the binder prevents the composite cutters to experience high stress during drilling and eliminates the formation of microcracks that extends the life of the drill bit.

BN has superior thermal stability and anti-oxidation properties compared to diamond alone. Because of their affinity in a structural lattice and their ability to form covalent bonding, diamond and cBN together can form composite with superior properties. The composites can fill structure performance gaps and overcome the current drilling challenges. Therefore, the composite cutter including ultra-hard diamond and BN has improved mechanical and thermal properties that enables the drill bits to improve drilling efficiency in extremely hard and abrasive formations. The drilling can be completed at a reduced time and with an improved rate of penetration (ROP) over current PDC cutters.

The details of one or more embodiments of these systems and methods are set forth in the accompanying drawings and the description below. Other features, objects, and advantages of these systems and methods will be apparent from the description and drawings, and from the claims.

DETAILED DESCRIPTION

This specification describes a method for fabricating catalyst-free ultrahard composite cutters that can be used to extend the life of PDC drilling tools. The drilling tools include PDC drill bits, reamers, hole openers, milling tools, and stabilizers. The models and methods described in this specification provide a mechanical alloying procedure to fabricate a composite cutter. The PDC drill bits with the composite cutters can be used to improve drilling efficiency in oil and gas wellbore formations.

A polycrystalline diamond powder and a cubic boron nitride powder with a characteristic grain size between 0.1 and 50 micrometers (µall) are mechanically mixed to form a composite mixture. The composite mixture is placed in a mold with a shape of a cutter and an ultra-high-pressure, high-temperature treatment (UHPHT) is applied. The sintering treatment initiates a solid phase reaction within the composite mixture as a result of applied pressure between 11 gigapascal (GPa) and 20 GPa, and applied temperature between 1300 Kelvins (K) and 2600 K. The solid phase reaction includes formation of new chemical bonds (e.g., boron-carbon (B—C) and carbon-nitrogen (C—N)) at or near the diamond and cBN grain boundaries of the diamond-cBN composite. After the UHPHT treatment is terminated, the composite mixture is cooled down and decompressed for up to 15 hours. The final composite mixture has a shape of a composite cutter ready to be assembled into a drill bit and drill highly abrasive oil and gas formations.

Figure 1:
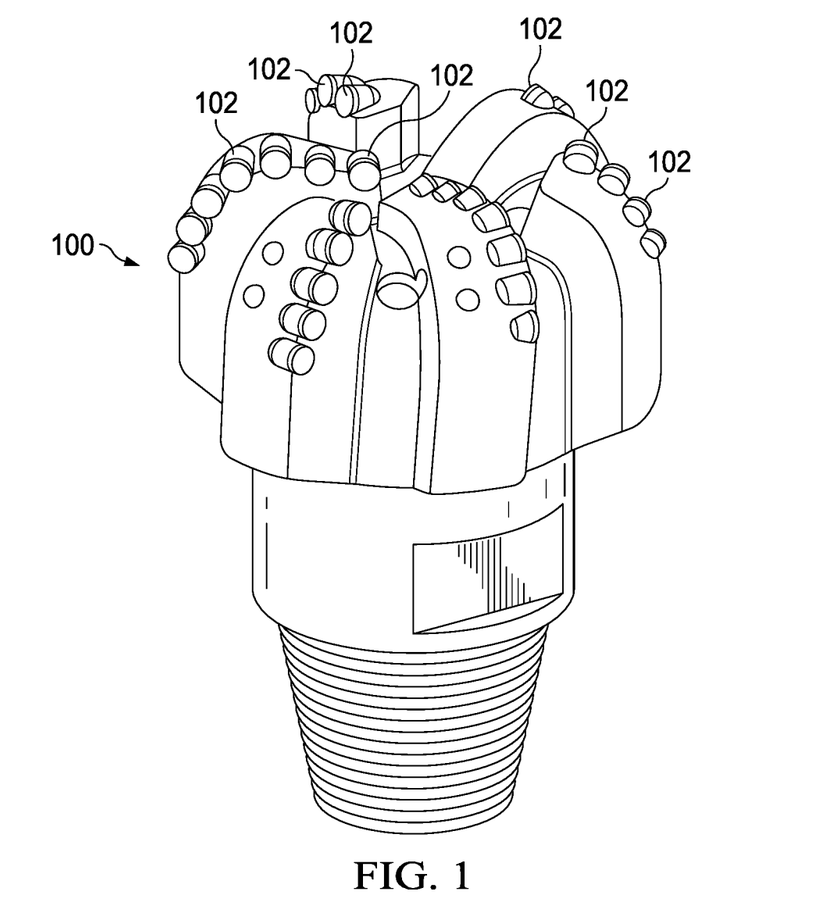
FIG. 1 is a perspective view of an example drill bit with PDC cutters used in the oil and gas industry for forming a wellbore.

FIG. 1 is a perspective view of an example drill bit 100 with PDC cutters 102 used in the oil and gas industry for forming a wellbore. The drill bit 100 includes a plurality of polycrystalline diamond compact (PDC) cutters 102. The PDC cutters operate to cut into the rock to form a wellbore. Drilling highly abrasive formations, especially horizontal formations, poses a challenge for PDC drill bits resulting in extremely low ROP and short bit life. Current drill bits do not provide sufficient wear or impact resistance, and adequate thermal stability to survive harsh drilling environment, and often result in drill bit failures.

Figure 2:
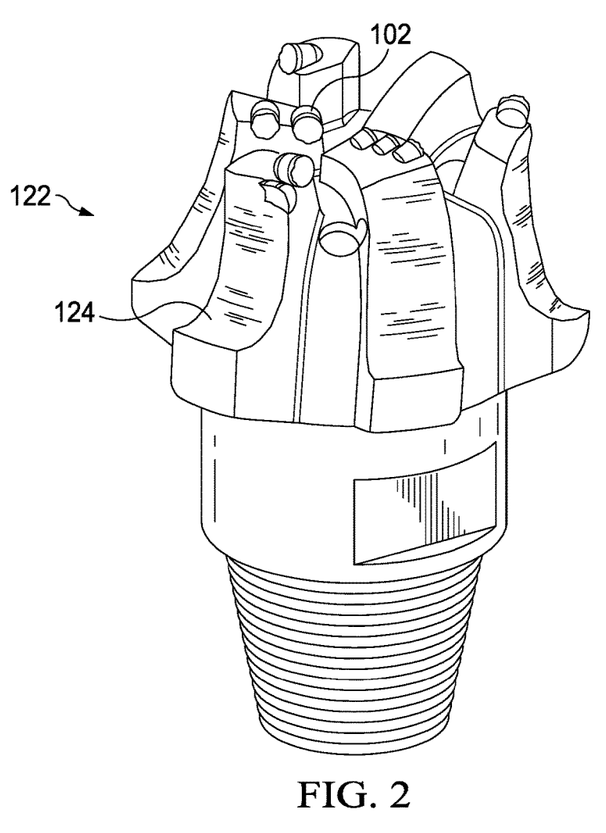
FIG. 2 is a perspective view of an example damaged drill bit after drilling a wellbore.

FIG. 2 is a perspective view of an example damaged drill bit 122 after drilling a wellbore. As illustrated, most of the cutters 102 are damaged with dull, ruined regions 124 left on the drill bit 122 and unable to continue the drilling operation. Cutters with improved mechanical and thermal properties can overcome the challenges of the current PDC cutters. Composite cutters can enable drilling operations in highly abrasive formations to be carried out to completion with less bit trips and operation time.

Figure 3A:
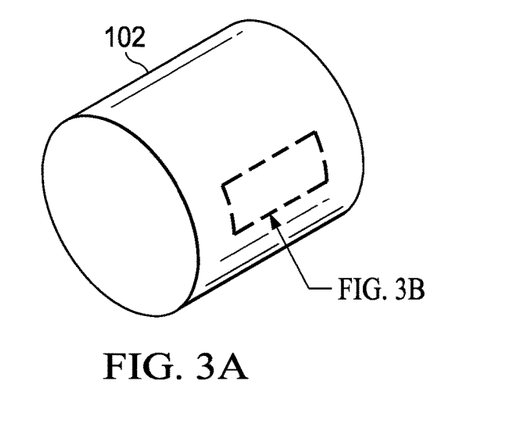
FIGS. 3A-3B are schematics of a composite cutter material for use in a drill bit.
Figure 3B:
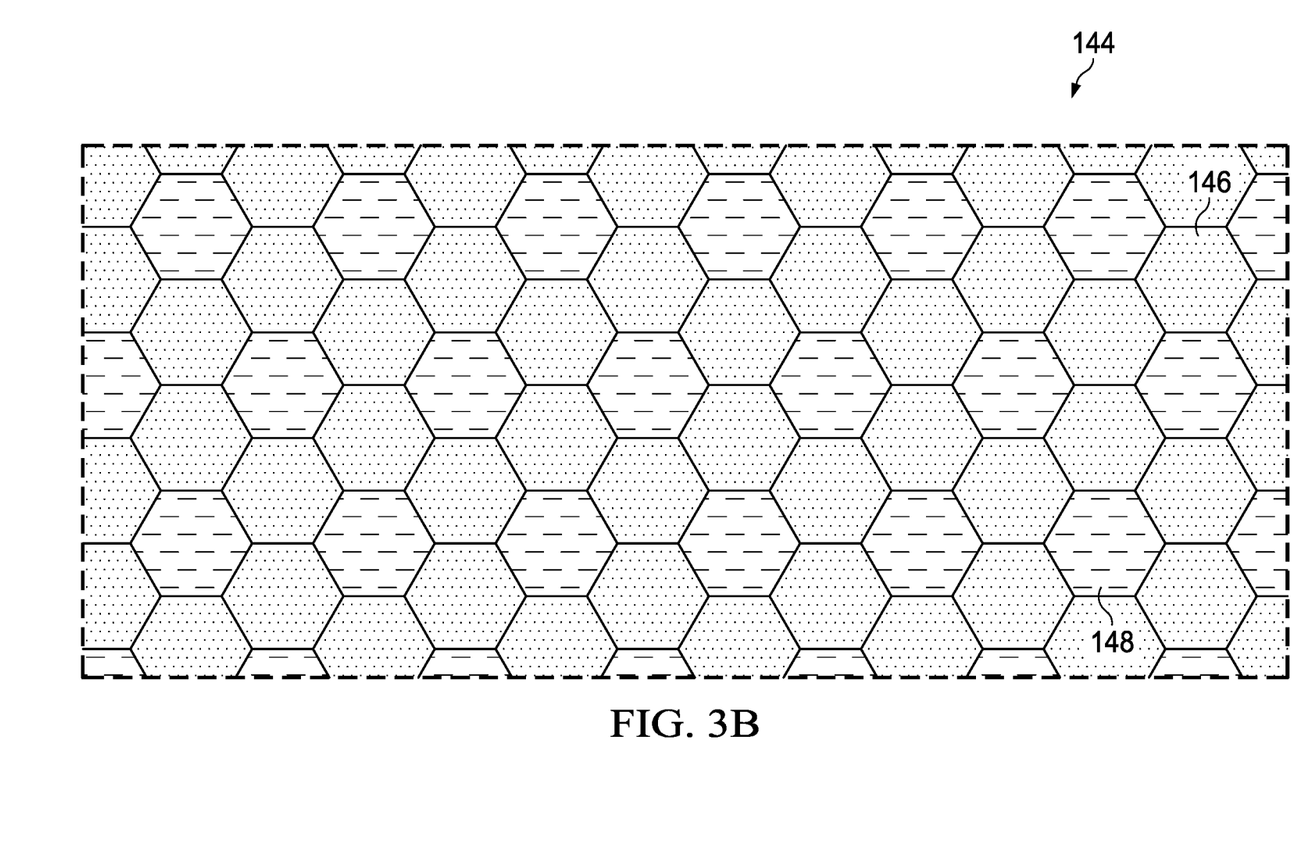

FIGS. 3A-3B are schematics of a composite cutter material 144 for use in a drill bit. The composite cutter 144 similar to the PDC cutter 102 and can be used in the drill bit 100. The composite cutter 144 includes cubic BN 148 and polycrystalline diamond 146 materials. In some implementations, the composite cutter 144 has a circular transverse cross-sectional shape. A diameter D of the composite cutter 144 varies according to the desired size of the cutter. For example, in some implementations, the cutter 144 may have a diameter D within a range of 8 mm to 48 mm. However, in other implementations, the diameter D of the cutter 144 may be greater than or less than the indicated range. In some implementations, the cutter 144 can have a cylindrical shape. In other implementations, the cutter 144 may have a tapered shape. In other implementations, the transverse cross-sectional shape of the cutter may be other than circular. For example, the cutter may be oval, square, rectangular, or have an irregular shape. The composite cutter 144 includes a catalyst-free synthesized composite mixture using ultra-high pressure and high temperature (UHPHT) treatment. The composite mixture includes the polycrystalline diamond powder and the cubic boron nitride powder with a molar ratio between 0.1 and 0.9. The catalyst-free synthesized composite mixture is then dried in a vacuum furnace at a temperature between 1100 K and 1300 K for a duration between 1 hour (h) and 2 h. After drying, the composite mixture is exposed to UHPHT treatment.

The UHPHT treatment includes forming a solid composite cutter using compressive pressure between 11 GPa and 20 GPa, and temperature between 1300 Kelvins (K) and 2600 K. Further details of this UHPHT process are described in U.S. patent application Ser. No. 16/524,935 filed on Jul. 29, 2019, U.S. Patent Application No. 63/031,077 filed on May 28, 2020, and U.S. Patent Application No. 63/033,669 filed on Jun. 2, 2020, and the entire content is incorporated here by reference. The composite cutter 144 can be formed using a two-stage, multi-anvil cubic press system (e.g., the 6-8 type, DS6×25 MN cubic press machine produced by Chengdu Dongwei Science and Technology Company of 2039 South Section of Tianfu Avenue, Tianfu New District, Chengdu 610213, Sichuan Province, P. R. China.)

Figure 4:
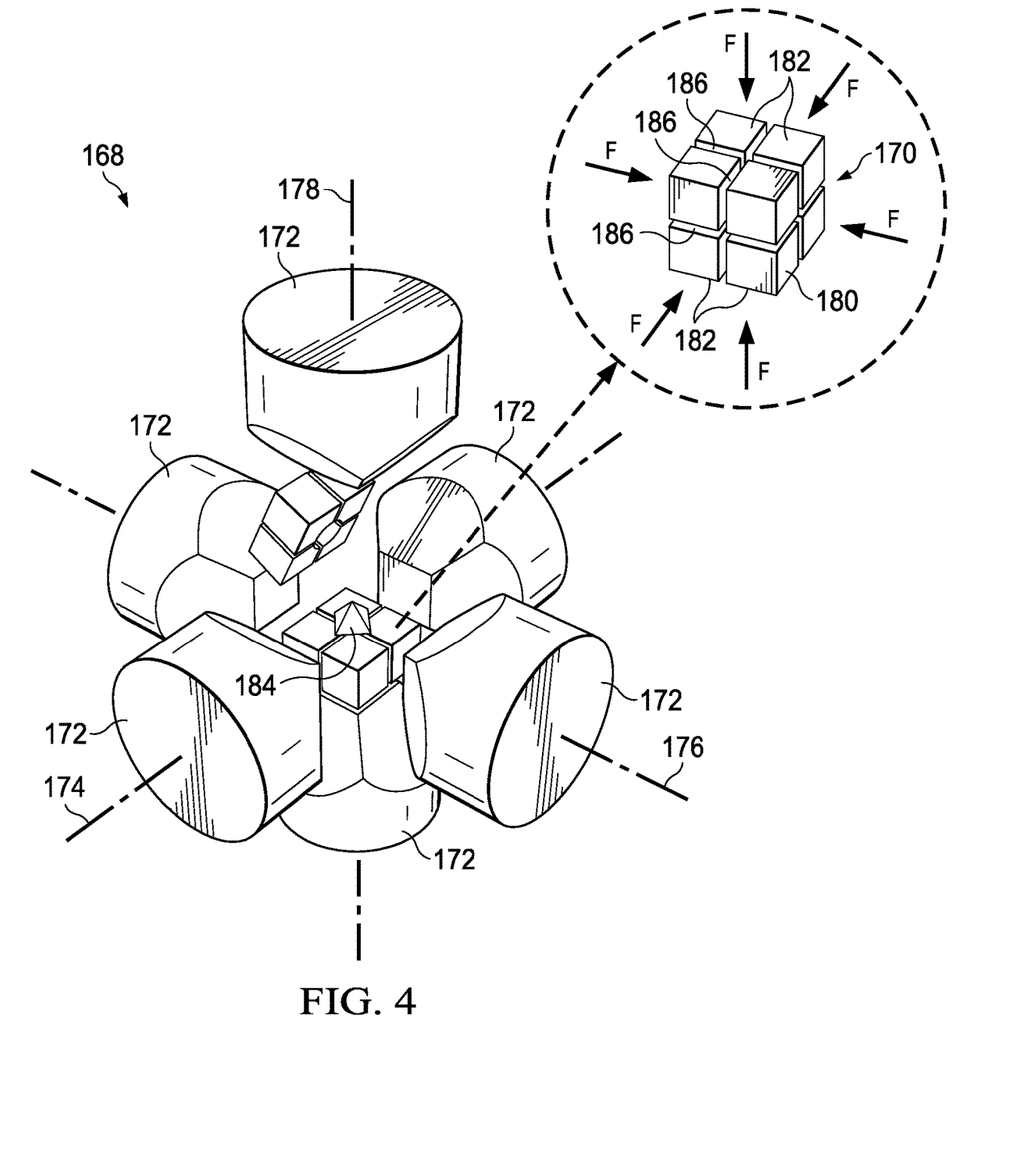
FIG. 4 is a detailed view of components of an example two-stage, multi-anvil cubic press used to form a composite mixture for use in a composite cutter for a drill bit.

FIG. 4 is a detailed view of components of an example two-stage, multi-anvil cubic press 168 used to form a composite mixture for use in a composite cutter 144 for a drill bit 100. These components include a first stage 168 and a second stage 170. The first stage 168 includes six anvils 172. The anvils 172 are arranged in aligned pairs along each axis of an orthogonal coordinate system. A pair of aligned anvils 172 are disposed along a first axis 174 (x-axis); a pair of aligned anvils 172 are disposed along a second axis 176 (y-axis) and a third axis (z-axis) 178. The axes 174, 176, and 178 are perpendicular to one another.

Figure 5:
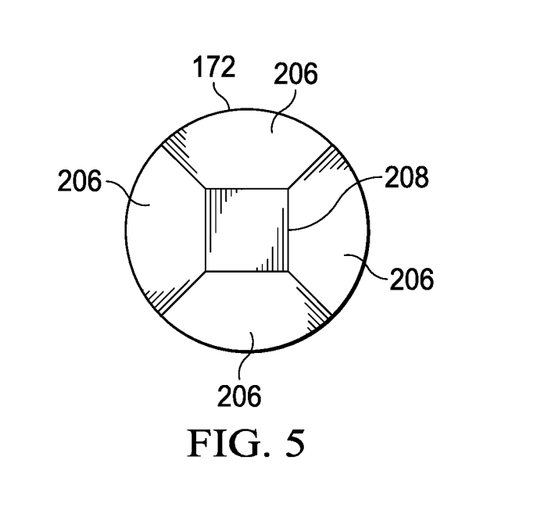
FIG. 5 is an end view of an example anvil used in a cubic press.

FIG. 5 is an end view of an example anvil 172 used in a cubic press. Each of the anvils 172 has chamfered edges 206 that defines a central contact surface 208. The chamfered edges 206 of an anvil 172 provide reliefs for adjacent anvils 172 such that the contact surfaces 208 of each anvil 172 can engage the second stage 170, described in more detail later. Referring again to FIG. 4, the second stage 170 is a booster 180 that includes eight cubes 182 that, collectively, define a cavity 184. In the illustrated example, cavity 184 is in the form of a square octahedron. Other cavity shapes may be used. For example, in other implementations, the booster 180 may define a cylindrical cavity, such as a cylinder having a circular cross-sectional shape. The cubes 182 are formed from WC—Co. The cubes 182 collectively form the booster 180 having a cubic shape, and each contact surface 208 of the anvils 172 contacts one of the end surfaces of the booster 180. The cavity 184 formed by booster 180 is filled with a material to be compressed, and the cubes 184 are cemented together to form the unitary booster 180 using, for example, WC/Co cement. Strips 186 (e.g., strips of pyrophyllite) are positioned between the cubes 182 and, during compression, act to form a seal between adjacent cubes 182.

The cavity 184 is filled with a composite mixture including the polycrystalline diamond powder and the cubic boron nitride powder. In some implementations, the powders may have particle sizes up to 50 μm. In some implementations, the powders may have particle sizes down to 0.1 μm. In some implementations, the powders may have a grain or particle size of between 8 micrometers (μm) to 12 μm. The composite mixture is treated in a vacuum furnace at approximately 1300 K (e.g., between 1100 K and 1350 K) for a duration between 1 and 2 hours. For example, a vacuum pressure of between $1\times10^{-2}$ and $1\times10^{-4}$ Torr can be applied to the composite mixture in the vacuum furnace. At this step, the particles of the mixture are still in a loose granular state during this treatment. In some implementations, the composite mixture is placed in a corundum container, which is introduced into a vacuum furnace. A vacuum is applied to the vacuum furnace until the pressure within the vacuum furnace between $1\times10^{-2}$ and $1\times10^{-4}$ Torr. The composite mixture is heated at a rate between 1 and 50° C. per minute until a temperature of approximately 1300 K is reached. When the vacuum treatment is complete, the composite mixture is incorporated into a capsule to form a composite cutter.

Figure 6A:
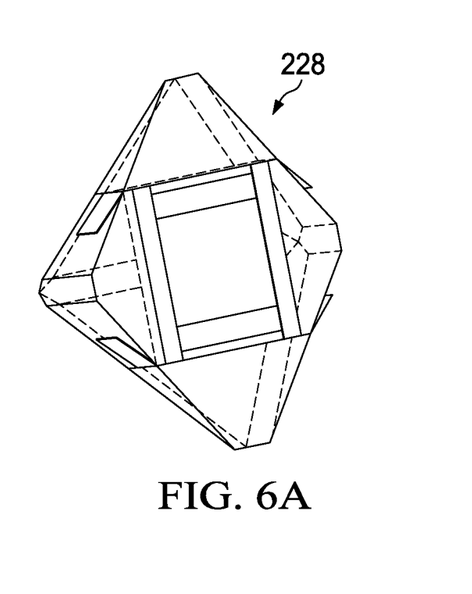
FIGS. 6A and 6B are schematic views of a capsule used to form a composite cutter.
Figure 6B:
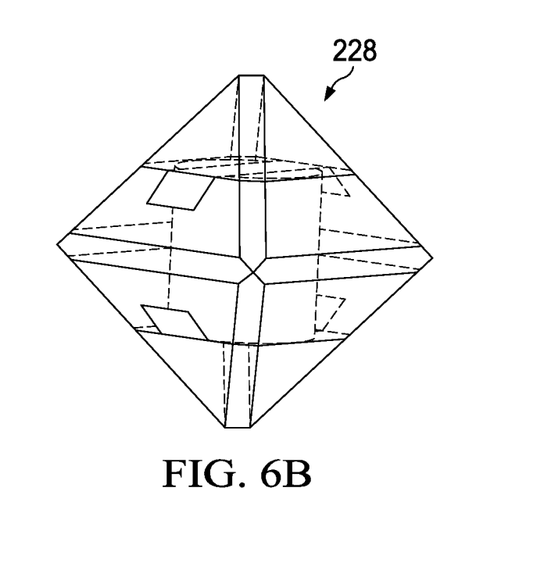

FIGS. 6A and 6B are schematic views of a capsule 228 used to form a composite cutter 144. In some implementations, the composite powder is pressed into a pellet with a relative density of around 78% and prior to introduction into the cylindrical capsule 228. In other implementations, the cylindrical capsule 228 is pressed into a pellet with a relative density of about 78% prior to introduction into the cavity 184. In some implementations, the cylindrical capsule 228 has a diameter of approximately 13 millimeters (mm) and a thickness of approximately 6.3 mm. However, the size of the cylindrical capsule 228 may depend on other factors, such as the size of the cutter desired, size of the cubic press, or other factors. The composite mixture including the particles from both elements 146 and 148 are packed into a capsule 228. In some implementations, the capsule 228 is a cylindrical capsule. The capsule 228 includes a metal foil made of 99.95% pure tantalum (Ta). The capsule 228 also includes a magnesium oxide (MgO) sleeve placed over the metal foil. The metal foil made of tantalum, rhenium (Re), or platinum (Pt), with a shape of a cylinder serves as a heater when an electric current is applied through the booster 180, and a zirconium dioxide ($ZrO_2$) serves as an insulator.

The capsule 228 is placed in the cavity 184 of the booster 180. A mixture of 99.99% pure MgO doped chromium trioxide ($Cr_2O_3$), at five percent by weight, is also introduced into the cavity 184 and serves as a pressure transmitting medium. With the cylindrical capsule and the pressure-transmitting medium added to the cavity 184, the booster 180 is enclosed and cemented with the strips 186 disposed between adjacent cubes 182. The booster 180 loaded with composite mixture is placed in between the anvils 172 of the first stage 168 of the cubic press. With the booster 180 in position, the anvils 172 are advanced and engage the booster 180. A central contact surface 208 of each anvil 172 contacts an adjacent exterior surface of the booster 180. Consequently, as loading is applied to the booster 180 by the anvils 172, the anvils 172 apply loads in six directions on the outer six surfaces of the booster 180. The loading applied by the anvils 172 pushes the cubes 182 towards each other, compressing the pressure-transmitting medium, thereby generating large pressures within the cavity 184. As the anvils 172 are advanced, the booster 180 deforms such that WC—Co material forming the cubes 182 is displaced into the gaps formed between adjacent anvils 172 at adjacent chamfered edges 208. As a result, this displaced WC—Co material forms sealing edges between the adjacent anvils 172. In some cases, the sealing material is pyrophyllite that is squeezing out to fill the gaps of the anvils to prevent the anvils from directly contacting each other. The central contact surfaces 208 and the sealed edges combine to form a two-stage pressure chamber. As loading is applied to the booster 180, the strips 186 placed between the cubes 182 and the pressure-transmitting medium are squeezed and flow to form a sealing edge between the adjacent cubes 182. Using this two-stage system, cutters with a variety of compositions and shapes can be fabricated.

Figure 7:
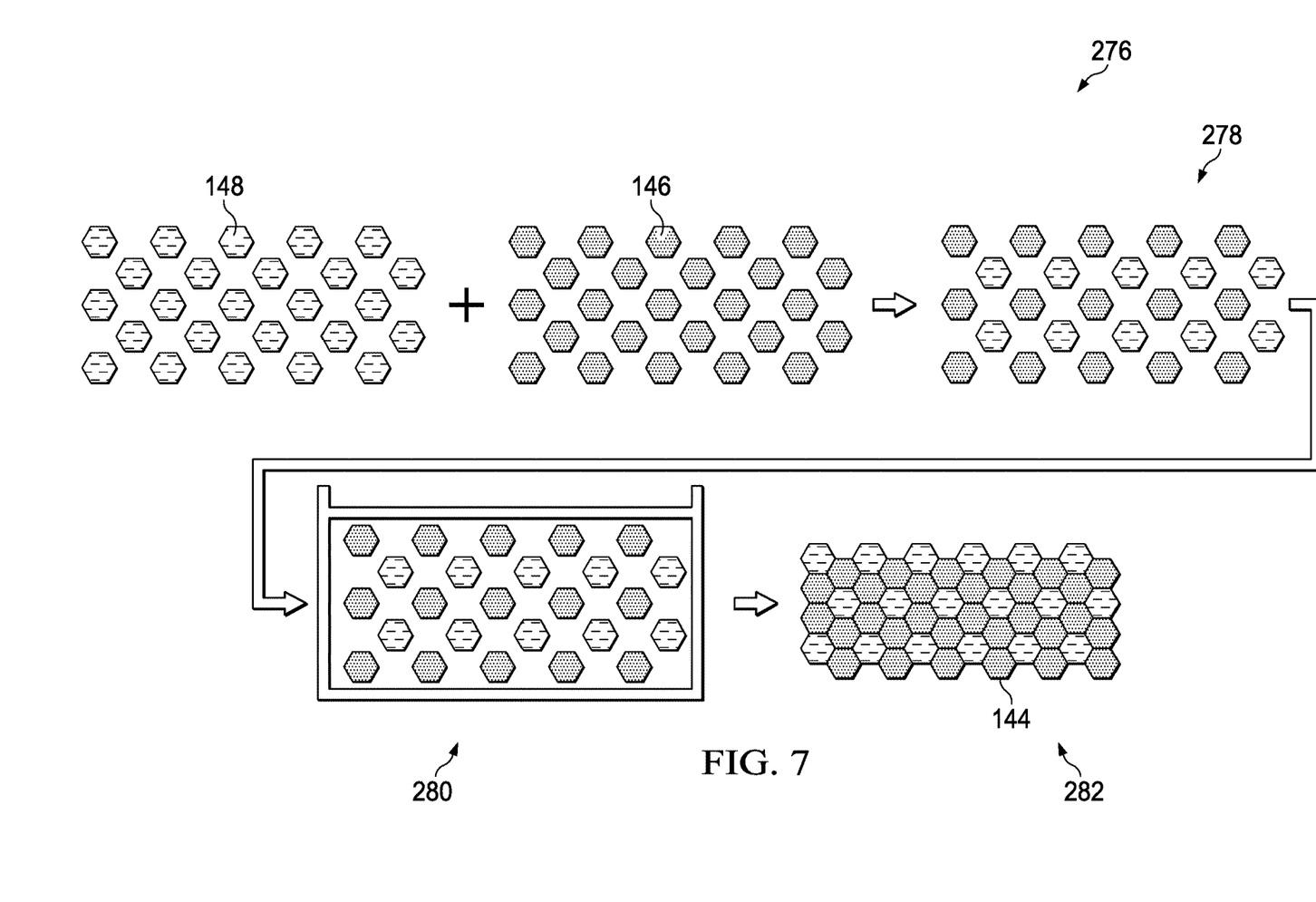
FIG. 7 is a schematic illustrating a method for fabricating a composite cutter.

FIG. 7 is a schematic illustrating a method 276 for fabricating a composite cutter 144. The method 276 begins at step 278 by pressing into a pellet a catalyst-free composite mixture that includes a 1:1 molar ratio of a polycrystalline diamond powder 148 and a cubic boron nitride powder 146, each powder with an average grain size of 3 μm. The composite mixture is dried in a vacuum furnace at a temperature of 1300K for 2 hours. At step 280, the composite mixture is sintered with ultra-high-pressure, high-temperature treatment. A pressure between 11 GPa and 20 GPa is steadily applied to the composite mixture. The pressure may be applied to the composite mixture by a set of anvils of a cubic press, such as the anvils 172 described earlier. The set of anvils apply the pressure to the composite mixture via a booster, such as the booster 180 described earlier. The composite mixture is also heated at a temperature between 1300 K and 2600 K. As explained earlier, the composite mixture may be disposed of within a capsule containing tantalum foil. A current may be passed through the booster and through the tantalum foil, which heats in response to the current, thereby heating the composite mixture. Once the temperature and pressure are at the "peak P-T conditions" the composite mixture is maintained under them for approximately ten minutes. At step 282, the composite mixture is formed into a solid composite body that is cooled to a room temperature at a rate between 10 and 50° C. per minute and decompressed between 2 and 10 hours.

UHPHT cutter production methods encompassed by the present disclosure may take from eight hours to twelve hours to complete. Also, although the example method 276 describes a maximum pressure applied to the sample of 20 GPa, the UHPHT methods encompass ultra-high pressures within a range of 10 GPa to 35 GPa. More generally, ultra-high pressures of a UHPHT method are greater than pressures used in current HPHT methods. Current HPHT methods involve pressures within a range of 5.5 GPa and 7 GPa. Thus, pressures in excess of those used in current HPHT methods are UHPHT pressures within the scope of the present disclosure. Although an upper range of 35 GPa is indicated, in other implementations, UHPHT methods within the scope of the present disclosure may use pressures that exceed 35 GPa.

With the UHPHT method complete, the sample is extracted, such as from a cubic press. In some implementations, the sample is subjected to an acid treatment to remove the one or more components included with the composite mixture. For example, where the composite mixture is incorporated into a capsule, such as a capsule 228 described earlier, the capsule is subjected to an acid treatment to remove tantalum foil. In some implementations, the sample is washed in water, followed by a wash in ethanol using an ultrasonic bath. The ultrasonic bath was used in washing with water first and then ethanol.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Accordingly, the previously described example implementations do not define or constrain the present disclosure. Other changes, substitutions, and alterations are also possible without departing from the spirit and scope of the present disclosure.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method of forming a composite cutter for a downhole drilling tool, the method comprising:
   mixing a polycrystalline diamond powder and a cubic boron nitride powder with a molar ratio between 0.1 and 0.9 to form a catalyst-free composite mixture;
   placing the catalyst-free composite mixture into a mold configured in a shape of a cutter;
   exposing the catalyst-free composite mixture to an ultra-high-pressure, high-temperature treatment comprising a pressure between 11 Gigapascals (GPa) and 20 GPa, and a temperature between 1300 Kelvins (K) and 2600 K to form a solid composite body; and
   cooling the solid composite body to form the composite cutter having a hardness greater than 70 GPa, wherein cooling the solid composite body includes between 2 and 10 hours of decompression.

2. The method of claim 1, wherein providing the catalyst-free synthesized composite mixture comprises the polycrystalline diamond powder and the cubic boron nitride powder with a characteristic grain size between 0.1 and 50 µm.

3. The method of claim 1, further comprising drying the catalyst-free synthesized composite mixture in a vacuum furnace at a temperature between 1100 K and 1350 K for a duration between 1 hour and 2 hours.

4. The method of claim 1, wherein the ultra-high-pressure, high-temperature treatment comprises between 1 minute and 10 minutes.

5. The method of claim 1, wherein sintering comprises forming a strong covalent bonding using the cubic boron nitride powder.

6. The method of claim 5, wherein the cubic boron nitride powder acts as a binder.

7. The method of claim 1, further comprises forming new chemical bonds at or near the diamond and cBN grain boundaries of the diamond-cBN composite.

8. The method of claim 7, wherein forming the new chemical bonds include B—C and C—N.

9. The method of claim 1, wherein the drilling tool comprises a PDC drill bit, a reamer, a hole opener, a milling tool, or a stabilizer.

10. The method of claim 1, wherein the composite cutter has an onset oxidation temperature greater than 1070 K.

* * * * *